June 1, 1948. A. SCHULTZ 2,442,439
TRACTOR HITCH
Filed May 24, 1946 2 Sheets-Sheet 1
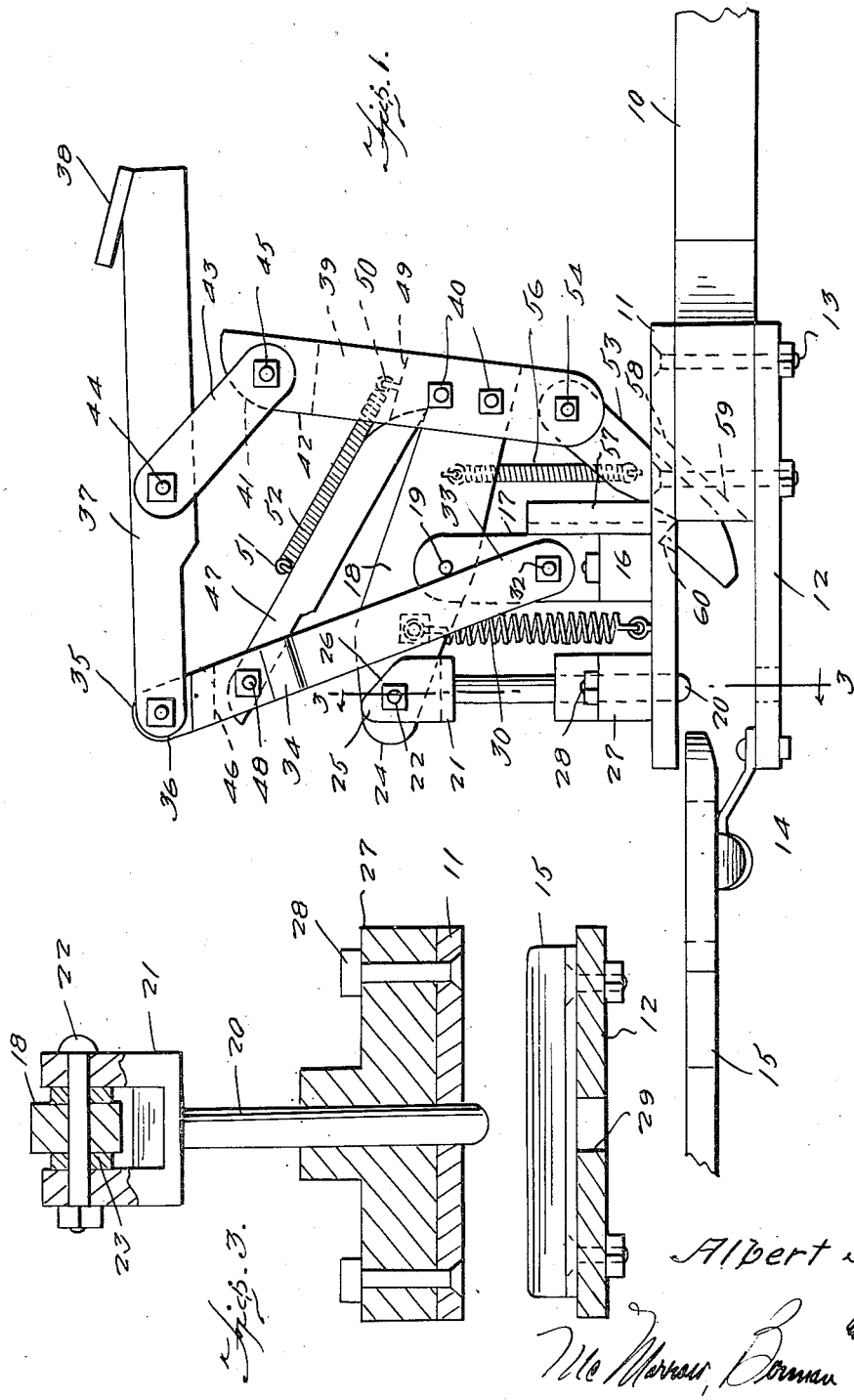
Inventor
Albert Schultz
Attorneys June 1, 1948.  A. SCHULTZ  2,442,439
TRACTOR HITCH
Filed May 24, 1946  2 Sheets-Sheet 2
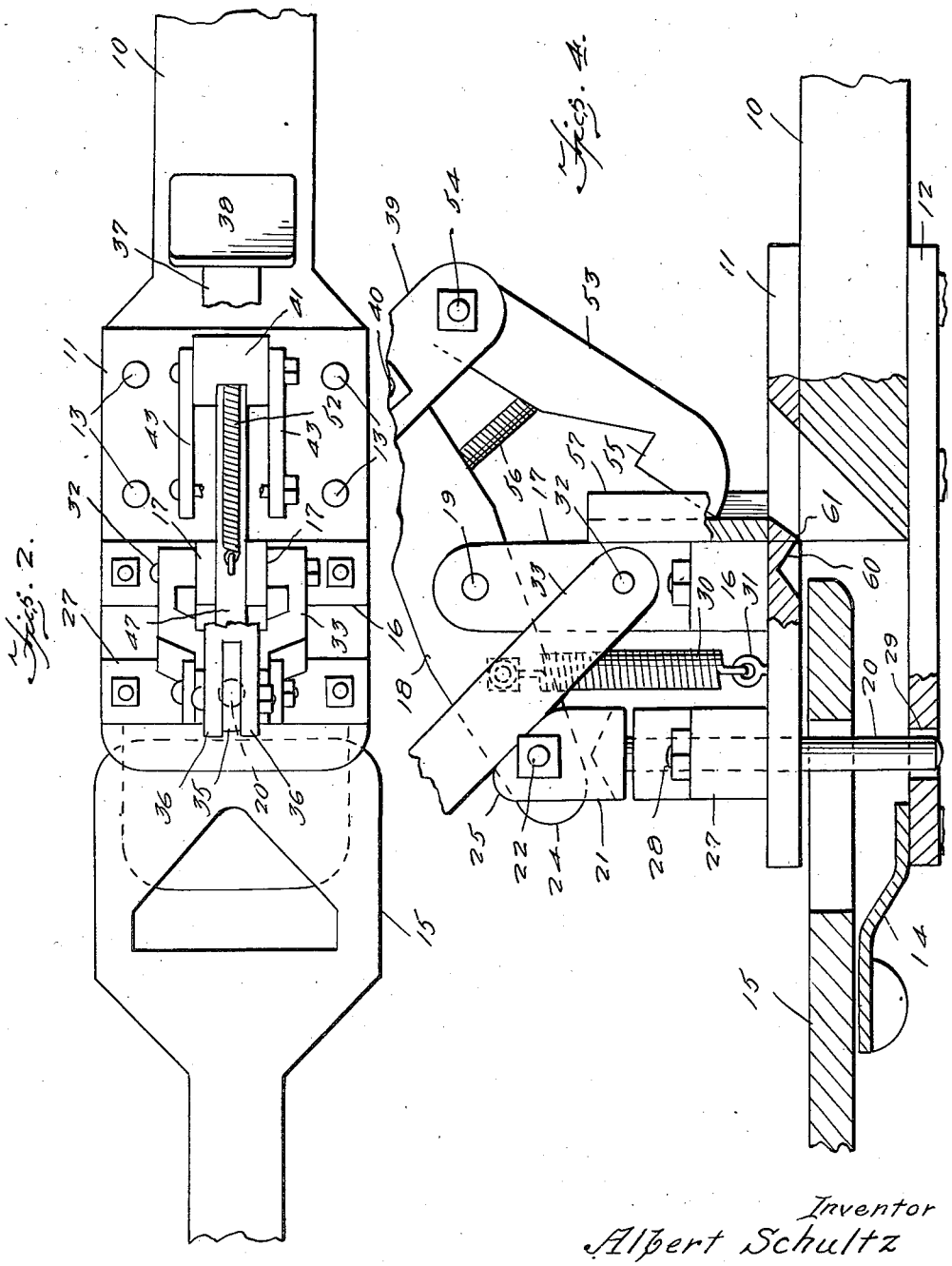
Inventor
Albert Schultz
Attorneys Patented June 1, 1948

2,442,439

UNITED STATES PATENT OFFICE 2,442,439

TRACTOR HITCH

Albert Schultz, Okeene, Okla.

Application May 24, 1946, Serial No. 671,921

5 Claims. (Cl. 280—33.15)

My invention relates to agricultural machinery and more particularly to tractor hitches.

The object of my invention is to provide a tractor hitch which will automatically secure a plow or the like to a tractor when the latter is backed up to the plow and the plow clevis slides into the hitch.

Another object of my invention is to provide a tractor hitch which can be operated by hand or foot from the driver's seat on the tractor to release it.

Other objects of my invention may appear in the following specification describing my invention with reference to the accompanying drawings ilustrating a preferred embodiment of my invention. It is however to be understood that my invention is not to be limited or restricted to the exact construction and combination of parts described in the specification and shown in the drawings, but that such changes and modifications can be made, which fall within the scope of the claims appended hereto.

In the drawings

Figure 1 is a side elevational view of the tracto hitch construction according to my invention, a clevis of a plow or the like being shown in position to be secured in the tractor hitch.

Figure 2 is a top plan view of Figure 1.

Figure 3 is a sectional view taken on line 3—3 in Figure 1, the plow clevis being omitted, and Figure 4 is a partial side elevational view of the tractor hitch according to my invention, shown in a bigger scale and partly in section, the hitch being arranged in clevis securing position.

Referring now in detail to my invention a tractor (not shown) has a rearwardly extending hitch supporting bar 10. The rearward end of this bar is wider than its forward end, and on the top surface of this widened supporting bar portion a top hitch plate 11 and on the under side of said portion a bottom hitch plate 12 are arranged and the two hitch plates are fastened to the supporting bar 10 by four countersunk head bolts 13. As shown clearly in Figures 1 and 4 the hitch plates 11 and 12 extend comparatively far beyond the rear end of the supporting bar 10.

On the lower hitch plate 12 a guide member 14 is arranged adapted to guide the clevis 15 of a plow (not shown) or any other agricultural machine onto the hitch and between the two hitch plates.

On the top hitch plate 11 a support block 16 is firmly secured and extends transversely thereof. Centrally of said support block 16 two spaced apart support members 17 extend upwardly therefrom.

A lever 18 is pivotally supported between the two spaced apart support members 17 by means of a shaft 19 extending through the two support members 17 adjacent their upper ends and through the lever 18 intermediate its ends.

A hitch bolt 20 has a bifurcated head 21 and the rear end of the lever 18 is located between the prongs formed by this bifurcation. A bolt 22 extends through holes provided in the prongs on the hitch bolt 20 and a hole in the rear end of the lever 18 and connects these parts pivotally with each other. At each side of the lever 18 a washer 23 is arranged on the bolt 22 between the said lever and the adjacent prong. The rear end of the lever 18 is rounded as at 24 and the upper ends of the prongs are also rounded as at 25, but the rear half of these portions of the prongs are flattened so that a downwardly and rearwardly extending surface is formed on each of the prongs as at 26.

A guide block 27 which is fastened to the top hitch plate 11 by means of bolts 28, extends transversely of the top hitch plate and is located so that the hitch bolt 20 extends through a hole provided and centrally arranged in the guide block and a hole in the top hitch plate 11. A hole 29 is provided in the bottom hitch plate 12 coaxially with the hole in the guide block 27. Onto each side of the lever 18 a helical spring 30 is fastened adjacent the bifurcated head 21 of the hitch bolt. These springs extend downwardly and their lower ends are secured to the upper hitch plate by means of eye bolts 31, so that the springs tend to pivot the rear part of the lever 18 downwardly to the position shown in Figure 4, so that the hitch bolt 20 extends through the hole 29 in the bottom hitch plate 11.

Underneath the shaft 19 a bolt 32 extends through the support members 17 and prongs 33 on a bifurcated connecting lever 34 are arranged to extend on the outside of the support members 17 and are pivotally mounted on the bolt 32. This connecting lever 34 extends rearwardly and upwardly and its upper end 35 is located between and pivotally connected with two prongs 36 formed on the bifurcated rear end of an operating lever 37, which extends forwardly and has on its forward end an operating pedal 38.

On the front end of the hitch bolt lever 18 two connecting members 39 are firmly attached by means of bolts 40. The hitch bolt lever 18 is located between the two connecting members 39. The rearward upper corners of these members are rounded as at 41 and a spacer block 42 is located between the upper ends of the connecting members 39, which extend upwardly.

Two connecting links 43 are arranged adjacent the outer side surfaces of the operating lever 37 and of the upper ends of the connecting members 39, and are pivotally connected with the operating lever 37 by a bolt 44 and to the connecting members 39 by a bolt 45.

In the part of the connecting lever 34 above the bifurcation thereof an opening 46 is provided, and the rear end of a stop bar 47 is located in this opening and is pivotally connected with the connecting lever 34 by a bolt 48.

On the rear end of the hitch bolt lever 18, which is located between the connecting members 39, an upwardly extending stop lug 49 is formed and has in its top surface an I-bolt 50. Another I-bolt 51 is provided in the upper surface of the stop bar 47 intermediate its ends. A helical spring 52 is attached with its ends to these two I-bolts and urges the rear end of the stop bar 47 into contact with the stop lug 49 as shown in Figure 1.

The lower ends of the connecting members 39 extend beyond the hitch bolt lever 18 and a lock lever 53 is located between and pivotally connected with these ends by means of a bolt 54. At a distance from its lower end a lock notch 55 is cut into the rear surface of this lock lever.

A helical spring 56 is fastened with its upper end to the hitch bolt lever 18 and with its lower end to the lock lever 53 urging the latter to swing rearwardly and upwardly.

On the forward edges of the support members 17 a channel shaped guide member 57 is fastened extending upwardly from the top hitch plate 11. The lock lever 53 is adapted to move slidably in the guide member 57 and a hole 58 is provided in the top hitch plate 11 and a corresponding hole 59 is arranged in the supporting bar 10 permitting the lower end of the lock lever to slide therethrough.

In the under side of the rearward edge of the top hitch plate 11 a notch 60 is cut forming a lock edge 61 on said plate, which is adapted to be engaged by lock notch 55.

When the hitch is not in use, as shown in Figure 1, and the tractor (not shown) is backed up to a plow (not shown) or the like the clevis 15 slides between the two hitch plates 11 and 12 guided by the member 14. When the clevis 15 hits the lower end of the lock lever 53, this lever is pivoted forwardly about the bolt 54 whereby it is disengaged from the lock edge 61.

The springs 30 then pivot the hitch bolt lever 18 about the bolt 19 so that the rear end thereof swings downwardly carrying the hitch bolt 20 downward into clevis engaging position as shown in Figure 4.

This pivotal movement of the hitch bolt lever 18 swings the connecting members 39 upwardly, so that the lock lever 53 is also moved upwardly sliding in the channel shaped guide 57. The upward movement of the connecting members 39 is transmitted to the connecting lever 34 through the stop bar 47 forcing the lever 34 to pivot rearwardly and downwardly about the bolt 32 and moving, at the same time, the operating lever 37 rearwardly and downwardly. The combined movements of the connecting members 39 and the operating lever 37, which are connected with each other by the links 43, result in a position of these elements, in which the connecting members 39 extend upwardly and rearwardly and the operating lever 37 rests on the top end of said members. At the same time, intermediate portions of the prongs 33 of the lower end of the connecting lever 34 come to rest on the beveled surfaces 26 of the ears 21 of bolt 20 (Figure 4). The clevis 15 is then securely engaged by the hitch bolt 20.

When it is desired to release the clevis 15 from this engagement, the operating lever 37 is shoved downwardly by pressure on pedal 38. Since lever 37 rests on the upper ends of the connecting members 39 and spacer block 42, these members are forced down, pivoting the hitch bolt lever 18 about the shaft 19 so that the hitch bolt 20 is raised into the position shown in Figure 1 releasing the clevis 15. The lock lever 53 slides downwardly in the channel shaped guide 57 until it enters the holes 58 and 59 in the top hitch plate 11 and the support bar 10. The helical spring 56 pivots the lock lever 53 about the bolt 54 into lock edge engaging position, thereby preventing the springs 30 from forcing the hitch bolt lever 18 to pivot about shaft 19 so that the hitch bolt 20 slides downwardly.

At the same time the forward and downward movement of the connecting members 39 is transmitted to the connecting lever 34 by the stop bar 47 and to the operating lever 37 by the links 43, so that these elements are positioned as shown in Figure 1.

The tractor hitch is then in readiness to engage automatically a clevis 15 entering between the top and bottom hitch plates.

Having described my invention, I claim as new and desire to secure by Letters Patent:

1. A tractor hitch adapted to be fastened to the draw bar of a tractor including a top hitch plate, a bottom hitch plate, the two plates being securely fastened to the top and under surfaces respectively of the draw bar, a guide member on the bottom hitch plate to guide a plow clevis or the like between the two plates, coaxially arranged holes in said plates, a hitch bolt adapted to slide upwardly and downwardly in and out of the holes in the hitch plates, spring means for urging the hitch bolt into downward clevis engaging position and locking means for maintaining said bolt in an upward position against the action of said spring means, supporting members extending upwardly from the top hitch plate, a hitch bolt lever pivotally mounted between said supporting members intermediate its ends, the hitch bolt being pivotally fastened on the rear end of said lever and the locking means being pivotally connected with the front end of said lever, a connecting member rigidly fastened to the front end of the hitch bolt lever, said locking means comprising a lock lever pivotally connected to said connecting member.

2. A tractor hitch adapted to be fastened to the draw bar of a tractor including a top hitch plate, a bottom hitch plate, the two plates being securely fastened to the top and under surfaces respectively of the draw bar, a guide member on the bottom hitch plate to guide a plow clevis or the like between the two plates, coaxially arranged holes in said plates, a hitch bolt adapted to slide upwardly and downwardly in and out of the holes in the hitch plates, spring means for urging the hitch bolt into downward clevis engaging position and locking mean for maintaining said bolt in an upward position against the action of said spring means, supporting members extending upwardly from the top hitch plate, a hitch bolt lever pivotally mounted between said supporting members intermediate its ends, the hitch bolt being pivotally fastened on the rear end of said lever and the locking means being pivotally connected with the front end of said lever, a connecting member rigidly fastened to the front end of the hitch bolt lever, said locking means comprising a lock lever pivotally connected to said connecting member, the top hitch plate being provided with a hole permitting the lock lever to enter therethrough, a lock edge on the under surface of the top hitch plate adjacent the hole therein, a lock notch in the rear surface of the lock lever, and a helical spring between the lock lever and the hitch bolt lever urging the lock lever into a locking engagement with said lock edge.

3. A tractor hitch adapted to be fastened to the draw bar of a tractor including a top hitch plate, a bottom hitch plate, the two plates being securely fastened to the top and under surfaces respectively of the draw bar, a guide member on the bottom hitch plate to guide a plow clevis or the like between the two plates, coaxially arranged holes in said plates, a hitch bolt adapted to slide upwardly and downwardly in and out of the holes in the hitch plates, spring means for urging the hitch bolt into downward clevis engaging position and locking means for maintaining said bolt in an upward position against the action of said spring means, supporting members extending upwardly from the top hitch plate, a hitch bolt lever pivotally mounted between said supporting members intermediate its ends, the hitch bolt being pivotally fastened on the rear end of said lever and the locking means being pivotally connected with the front end of said lever, a connecting member rigidly fastened to the front end of the hitch bolt lever, said locking means comprising a lock lever pivotally connected to said connecting member, the top hitch plate being provided with a hole permitting the lock lever to enter therethrough, a lock edge on the under surface of the top hitch plate adjacent the hole therein, a lock notch in the rear surface of the lock lever, and a helical spring between the lock lever and the hitch bolt lever urging the lock lever into a locking engagement with said lock edge, and a channel shaped guide member on the rear edges of the supporting members, extending upwardly from the upper hitch plate and adapted to guide the lock lever slidably into and out of working position.

4. A tractor hitch adapted to be fastened to the draw bar of a tractor including a top hitch plate, a bottom hitch plate, the two plates being securely fastened to the top and under surfaces respectively of the draw bar, a guide member on the bottom hitch plate to guide a plow clevis or the like between the two plates, coaxially arranged holes in said plates, a hitch bolt adapted to slide upwardly and downwardly in and out of the holes in the hitch plates, spring means for urging the hitch bolt into downward clevis engaging position and locking means for maintaining said bolt in an upward position against the action of said spring means, supporting members extending upwardly from the top hitch plate, a hitch bolt lever pivotally mounted between said supporting members intermediate its ends, the hitch bolt being pivotally fastened on the rear end of said lever and the locking means being pivotally connected with the front end of said lever, a connecting member rigidly fastened to the front end of the hitch bolt lever, said locking means comprising a lock lever pivotally connected to said connecting member, the top hitch plate being provided with a hole permitting the lock lever to enter therethrough, a lock edge on the under surface of the top hitch plate adjacent the hole therein, a lock notch in the rear surface of the lock lever, and a helical spring between the lock lever and the hitch bolt lever urging the lock lever into a locking engagement with said lock edge, a bifurcated connecting lever pivotally connected with the support members, an operating lever pivotaly attached to the top of the connecting lever and extending forwardly therefrom, a pair of connecting links pivotally connected to the operating lever and to the upper end of said connecting member, a stop lug carried by said connecting member, a stop bar pivotally connected at its rear end to the connecting lever and a helical spring fastened to the stop bar and the stop lug, and urging the rear end of the stop bar into contact with the stop lug.

5. A tractor hitch comprising a substantially horizontal draw bar formed to provide a pair of vertically-extending holes therethrough, one of said holes being located adjacent the rear end of said draw bar, the other hole being forwardly-spaced from said first hole, an elongated lever pivotally connected between its ends to the upper surface of said draw bar intermediate said holes, the free ends of said lever overlying said holes, a hitch bolt carried by the rear end of said lever and adapted to be reciprocated through said hole to a locking position upon depression of said rear end of said lever, a latch detent on the under surface of said draw bar adjacent the rear edge of said second hole, a spring latch carried by the forward end of said lever, said latch being extensible through said second hole and automatically engageable with said detent upon depression of said front end of said lever, whereby to lock said hitch bolt in an unlocked position, means loading said hitch bolt for movement to a locking position, and said latch including means engageable with a trailer clevis or the like upon rearward movement of said draw bar above said clevis and operative to disengage said latch and permit automatic movement of said bolt to a locking position upon continuation of said rearward movement.

ALBERT SCHULTZ.

REFERENCES CITED

The following references are of record in the file of this patent:

UNITED STATES PATENTS

| Number | Name | Date |
| --- | --- | --- |
| 773,537 | Boese | Nov. 1, 1904 |
| 945,683 | Beydler et al. | Jan. 4, 1910 |
| 1,448,950 | Uecker | Mar. 20, 1923 |
| 1,837,940 | Ade | Dec. 22, 1931 |
| 2,002,922 | Onken | May 28, 1935 |

FOREIGN PATENTS

| Number | Country | Date |
| --- | --- | --- |
| 639,396 | Germany | Dec. 4, 1936 |